United States Patent [19]

Bird et al.

[11] Patent Number: 5,139,218
[45] Date of Patent: Aug. 18, 1992

[54] FAST EARTH RECOVERY PROCEDURE FOR EARTH-POINTING SATELLITES

[75] Inventors: Aneurin G. Bird, Katwijk; Leopold C. van Holtz, Aerdenhout, both of Netherlands

[73] Assignee: Agence Spatiale Europeenne, France

[21] Appl. No.: 427,902

[22] Filed: Oct. 24, 1989

Related U.S. Application Data

[63] Continuation of Ser. No. 69,013, Jul. 1, 1987, abandoned.

[30] Foreign Application Priority Data

Jul. 4, 1986 [FR] France ............................ 86 09727

[51] Int. Cl.$^5$ ............................................. B64G 1/28
[52] U.S. Cl. .................................................. 244/165
[58] Field of Search ............... 244/164, 165, 169, 170, 244/171; 318/649

[56] References Cited

U.S. PATENT DOCUMENTS

| | | | |
|---|---|---|---|
| 4,272,045 | 6/1981 | Phillips | 244/170 |
| 4,294,420 | 10/1981 | Broquet | 244/171 |
| 4,358,076 | 11/1982 | Lange et al. | 244/171 |
| 4,437,047 | 4/1984 | Smay | 318/649 |

OTHER PUBLICATIONS

Hsing et al., "Gyro-Based Attitude Reference Systems for Communications Satellites," J. Guidance & Control, pp. 239-244, vol. 3, No. 3, 1980.

Teule et al., "IRAS attitude control, Principles & verification," Journal A, pp. 170-176, vol. 24, No. 4, 1980.

*Primary Examiner*—Galen Barefoot
*Attorney, Agent, or Firm*—Andrus, Sceales, Starke & Sawall

[57] ABSTRACT

The invention provides a fast earth recovery procedure for an earth-pointing satellite, being compatible with known ARM and ESR safeguard modes, and including two successive phases shown in the flow chart of FIG. 2. The procedure may be entered at an intermediate step if the attitude deviation is sufficiently small. The invention is applicable to satellites with momentum bias attitude control or zero momentum attitude control.

17 Claims, 7 Drawing Sheets

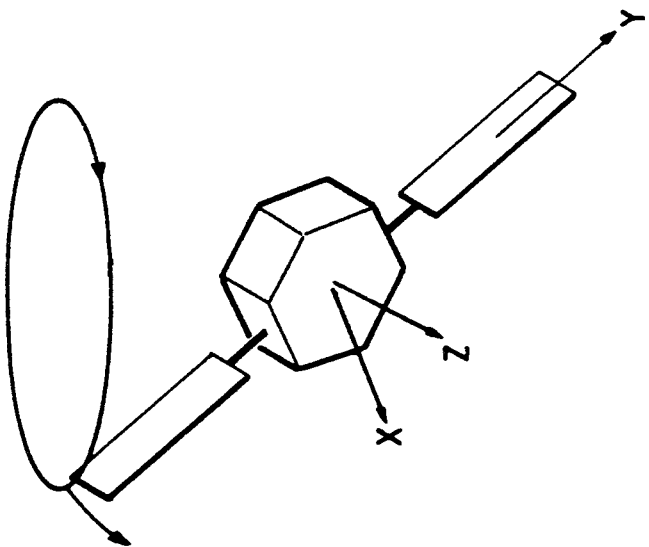
FLAT SPIN FIG.5
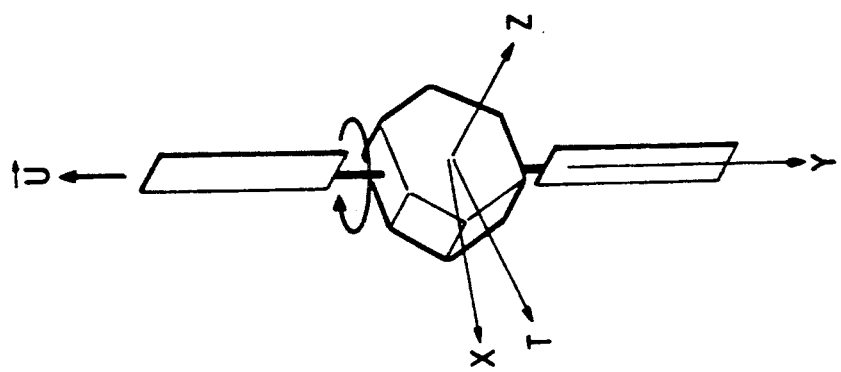
ACCIDENTAL CHANGE OF ATTITUDE FIG.4
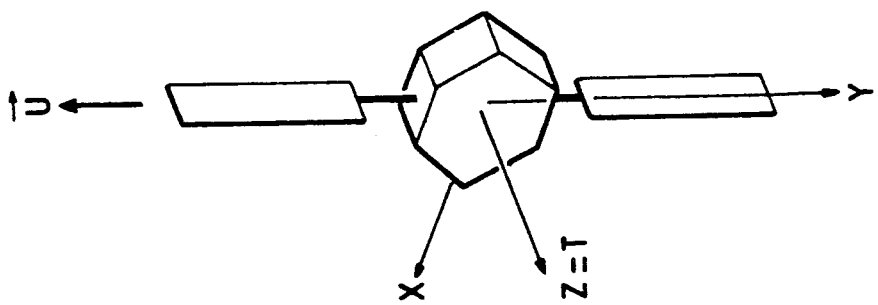
NORMAL EARTH POINTING FIG.3

NORMAL EARTH POINTING

SUN POINTING
(ERS MODE)

CONDITION OF ORTHOGONALITY

FAST EARTH RECOVERY PROCEDURE FOR EARTH-POINTING SATELLITES

This is a continuation of application Ser. No. 07/069,013, filed Jul. 1, 1987, and now abandoned.

BACKGROUND OF THE INVENTION

An accidental change in the attitude of a satellite may be produced following various types of failure or clumsy manoeuvres. Among others, the following may be noted:

- equipment failures, such as failure of the drive system of the solar array, seizure of the momentum wheels, earth sensor optical fault or thruster sticking open;
- electrical failures, essentially in the inertia unit, or also variations in the power available causing a temporary failure of the attitude control servo-loops;
- design limitations in the satellite control unit, for example cases of the perturbation of the earth sensors by the passage of the sun or the moon through their field of view or also if servo-loops interact in unforeseen manner;
- errors of manipulation due to programming mistakes in the on-board software, or erroneous commands received from the ground, under automatic or manual control.

This type of failure is likely to perturb the operation of the satellite seriously, or even interrupt it, and it is only operational under strict conditions of orientation. This is especially the case for geo-stationary telecommunication satellites stabilized on three axes in earth-pointing.

DESCRIPTION OF THE PRIOR ART

Telecommunication satellites of the current generation, of European or American manufacture, were designed with relatively little constraints on re-pointing procedure requirements after accidental attitude change.

In the case of loss of orientation (FIG. 10b), the satellite automatically adopts two successive safeguard configurations:

automatic reconfiguration mode (ARM);
emergency sun reacquisition (ESR).

The object of the ARM is to switch the attitude and orbit control system (AOCS) to a standby state following loss of power or loss of pointing control. All the attitude control units are switched from prime to redundant, except for the wheels in the case of a skewed wheel configuration. A fifteen-minute timer is also started upon ARM initialization and gives the ground operator an opportunity to diagnose the severity of the failure and if possible remedy it in the time allowed.

For cases of minor failures which are readily repaired, this transitional mode enables a too long and unnecessary interruption to the communication service to be avoided. The operator may prolong the ARM beyond the quarter-hour programmed by the timer, if desired. However the duration of the action is limited by the fact that in ARM the solar array drive is also inhibited which means that the solar array stays locked relative to the spacecraft body in the orientation at the time of failure.

In the case where pointing control could not be reestablished in the ARM, the satellite automatically switches to the ESR mode. The purpose of this mode is to bring the satellite to a safe sun pointing mode, so that it is supplied with energy. All the units of the payload and the attitude control are switched off, except for those necessary for sun aquisition, so as to protect the satellite from any possible further on-board errors. The apparatus for sun acquisition comprises simple dedicated back-up loops, using redundant energy supplies and redundant thrusters and propellant lines.

In the case of a momentum bias satellite (i.e. with a momentum wheel (or system of wheels) providing inertial reference), the wheel is run down, momentum is destroyed, and the satellite is kept on sun-pointing under control of the sun sensors (SAS) and thrusters, with the arrays locked sun pointing.

In the current systems, recovery from ESR can only occur under certain relative conditions of the relative positions of the sun and the earth with respect to the satellite. This constraint prevents immediate re-pointing of the satellite on repair of the failure, this lack of flexibility causing additional down-time of the satellite.

In fact, in a known system, earth re-pointing is performed using the earth sensor and an earth acquisition control loop. The wheel is then spun up so as to resume the normal mode. However, since the satellite is initially pointing its x or y axis towards the sun and since the earth sensor (infra-red: IRES) has its field of view along the z axis, the sun and earth directions seen from the satellite must be orthogonal (see FIG. 12c). Such a situation only exists at 0600 and 1800, satellite local time, which may represent up to twelve hours non-operational wait. It will be noted that the down-time may even go up to twenty-four hours in the case where one roll axis only may be used in sun pointing in the ESR procedure (for example in the OTS satellite).

In summary, existing techniques of placing on hold then repointing the satellite to earth pointing have several disadvantages, including:

- the reaction time of fifteen minutes is usually too short to enable the operator to react and can scarcely be prolonged without using up excessively the solar energy reserves;
- the emergency sun pointing corresponds to achievement of maximum security but causes the use of micro-thrusters in a control-loop consuming up to several kilograms of propellant. Also, failure of the spare micro-thrusters used in ESR mode (leakage or accidental prolonged operation) may completely compromise the stability in ESR mode. The time for earth repointing from the ESR mode is too long. This point is especially true for the new generation of telecommunication satellites (Inmarsat 2, ECS-A) in which it is necessary to limit the possible loss of communication to a maximum of one-and-a-half hours. This constraint is now also a requirement for satellites already in orbit.

OBJECTS OF THE INVENTION

An object of the invention is to provide an earth recovery procedure which enables some or all of the above disadvantages to be avoided. In more detail, a first object of the invention is to provide a fast earth pointing recovery system and procedure namely for telecommunication satellites enabling return to the nominal conditions of operation in less than one hour from the emergency sun pointing mode.

A second object of the invention is to provide such procedures which may be controlled from the ground and alternatively may be controlled by an on-board software package using a relatively simple algorithm.

A third object of the invention is to provide such procedures for application to both momentum bias satellites and zero momentum satellites.

A complementary object of the invention is to provide a procedure which takes the form of a succession of steps whose sequence may be followed only partially in the case of accidental attitude changes of little severity. More precisely, if the procedure indeed enables a rapid return to earth pointing from the ESR mode, it is also to be possible to use only the last steps enabling a satellite which is nutating with moderate angular speeds to be brought under control without it being necessary to resort first to sun pointing.

Another object of the invention is to provide such a procedure and system whose application to momentum bias satellites enables to do totally without the thrusters for the re-pointing operation.

An object of a preferred embodiment of the invention is to permit operation using equipment, available on certain satellites already in orbit, namely redundant available sensors.

Yet another object of the invention is to provide a procedure with a high degree of flexibility, without any specific time constraint for the commands transmitted or for the reaction of operators on ground, and including at least one step of deploying the solar panels towards the sun so as to avoid energy cuts. Also the procedure does not prevent return to the maximum security emergency sun re-pointing (ESR) mode in the event of malfunction and interruption of the procedure, and re-pointing by the known long procedure referred to above.

DESCRIPTION OF THE INVENTION

These objects are obtained, according to the invention, by using a two-step procedure based on following principles:

phase A of the procedure enables bringing back the satellite from an ESR mode to an intermediary attitude in which the pitch axis of the satellite moves within a reduced range of values around the earth direction, with reduced nutation and angular rates. This phase is accomplished through determination and control of pitch angular rate and position of the satellite relative to the sun direction. Two embodiments for this phase A will be detailed hereunder.

phase B corresponds to the fast recovery phase strictly speaking, and consists in bringing the satellite from its reduced nutation and angular rates into three axes earthwards stabilization. This is obtained through a succession of steps intended at first progressively damping the nutation rate, and then precisely aligning the pitch axis of the satellite. This phase is differently carried out according to whether the satellite is momentum bias stabilized, or zero momentum stabilized. Moreover, in the embodiment of phase B corresponding to momentum bias satellites, the steps correspond to a better stabilization when following up the procedure. This enables selectively entering phase B at an intermediary step of phase B for earth pointing recovery from slight attitude modifications following non important contingencies.

Claim 1 relates to the embodiment of phase B adapted to momentum bias satellites, and provides an earth recovery procedure for a nominally earth-pointing satellite, said satellite comprising solar panels, sun sensors, earth sensors and/or gyrometers, pitch servo-control means, roll servo-control means such, attitude correction means as momentum wheel(s) and/or thrusters for altering the satellite attitude, said procedure including at least the following steps in the stated order with the possibility of alternative entering the procedure at an intermediate step:

(i) an initialization step comprising deactivating the servo loop of said roll servo control means, connecting all said sun and earth sensors and/or gyrometers, and assuming open-loop control of attitude using said attitude correction means;

(ii) a pitch pre-stabilization step comprising placing the satellite in dual spin configuration, with counterrotating body, responding to signals from said sun and earth sensors to determine pitch rate, and controlling the pitch rate using said attitude correction means;

(iii) a pitch recovery step comprising bringing the pitch rate within the operating limits of said pitch servo control means by earth capture in pitch with single axis control and;

(iv) a residual nutation damping step comprising exerting transverse roll/yaw torque by action on said momentum wheel and/or thrusters until earth capture by said roll servo control means.

The pitch pre-stabilization enables the pitch axis to be controlled. The nutation damping enables the satellite to be brought subsequently under full three-axis control; this phase is different according to whether the satellite stabilization system comprises a momentum bias system or not. In the case of a small accidental change of attitude, the procedure may be entered at an intermediate step.

The procedure may include an additional nutation coarse damping step previous to said pitch recovery step if said nutation is of an amplitude greater than the operating limits of said pitch servo control means, said additional nutation damping step comprising locking said solar panels at an angle of substantially 180° relative to each other, so as to improve power balance, and damping said nutation either through active control by adjusting transverse momentum (using wheels or thrusters), or passive control by using momentum exchange between the pitch wheel and spacecraft body.

The fast recovery procedure (phase B on FIG. 2) as detailed above, advantageously applies for satellites placed in ARM following an accidental change of attitude. This phase thus advantageously avoids placing the satellite in ESR mode.

However, the invention is also applicable if the satellite has already been placed in ESR mode. In this case, phase A enabling bringing the satellite from the ESR mode up to the beginning of the fast recovery procedure (phase B) detailed above comprises following steps:

a solar array servo control step in which the solar arrays are pointed and locked sunwards using sun sensors mounted on said solar panels;

a solar panel skewing step in which the bearing and power transfer assembly is skewed relative to said solar panels by an angle related to that between the sun and earth directions seen from the satellite at the local time of the manoeuvre;

a satellite attitude determination step in which the satellite attitude (angular rate and position of the pitch axis) is determined by reference to the cyclic variation of signals from said earth sensor during roll movement of the satellite.

As this first embodiment of phase A of the invention is applicable to satellites already is orbit, using the current on-board equipment, a second embodiment of phase A is also provided by the invention for bringing the satellite from the ERS mode up to the beginning of the fast recovery procedure of phase B.

This second embodiment consists in implementing a slit or matrix type star tracker of low accuracy, for position and rate detection of the roll angle, using groundbased pattern recognition techniques for stars of selected illumination level only.

The steps for this second embodiment of phase A may be summed up as follows:
 a star detection step in which stars are detected using said star tracking means;
 a satellite attitude determination step in which the satellite attitude is determined by reference to the location of said stars;
 a roll rate arresting step with wheel spin up and/or gyrometer initialization at a time when the pitch axis is in a position favourable to the fast earth recovery of phase B as described above.

In the case where the satellite uses a zero momentum stabilization system, the gyrometers of the inertia control unit may be started at the moment when roll rate is stopped and the pitch axis is brought in a position favorable for earth re-pointing.

In this case, the angular velocity data from the integrator gyrometers may be used to ensure earth re-pointing by Euler angles processing and locking in stabilized position.

DESCRIPTION OF THE DRAWINGS

Other features and advantages of the invention will appear from the following description of embodiments thereof, given by way of example with reference to the accompanying drawings in which:

FIGS. 3, 4 and 5 are diagrammatic perspective views of the satellite showing its attitude during normal earth pointing, loss of earth lock, and in flat spin, respectively;

DETAILED DESCRIPTION OF THE PREFERRED EMBODIMENT

In the satellite shown in FIG. 1, the roll axis is x, the pitch axis is y, and the yaw axis is z.

When it is in earth orbit, and stabilized in earth pointing, the satellite points its yaw axis towards the ground and follows its orbit in the direction of the roll axis.

Figure 1B:
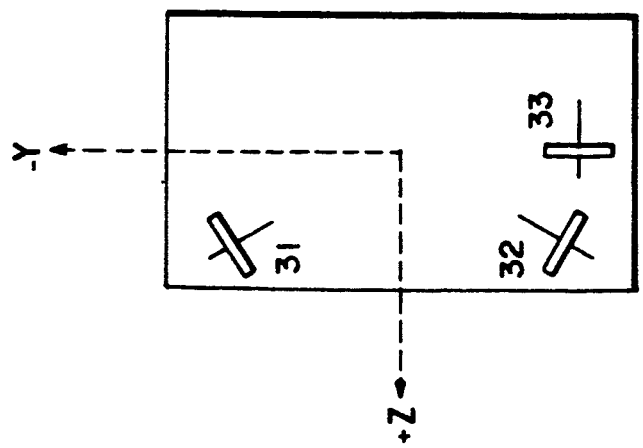
FIGS. 1a and 1b are diagrammatic perspective and side views of a satellite showing the attitude and orbit control system (AOCS) and the preferred positions for the earth and sun sensors (FIG. 1a), and a preferred embodiment of the inertia stabilization unit including momentum wheels (FIG. 1b)
Figure 1A:
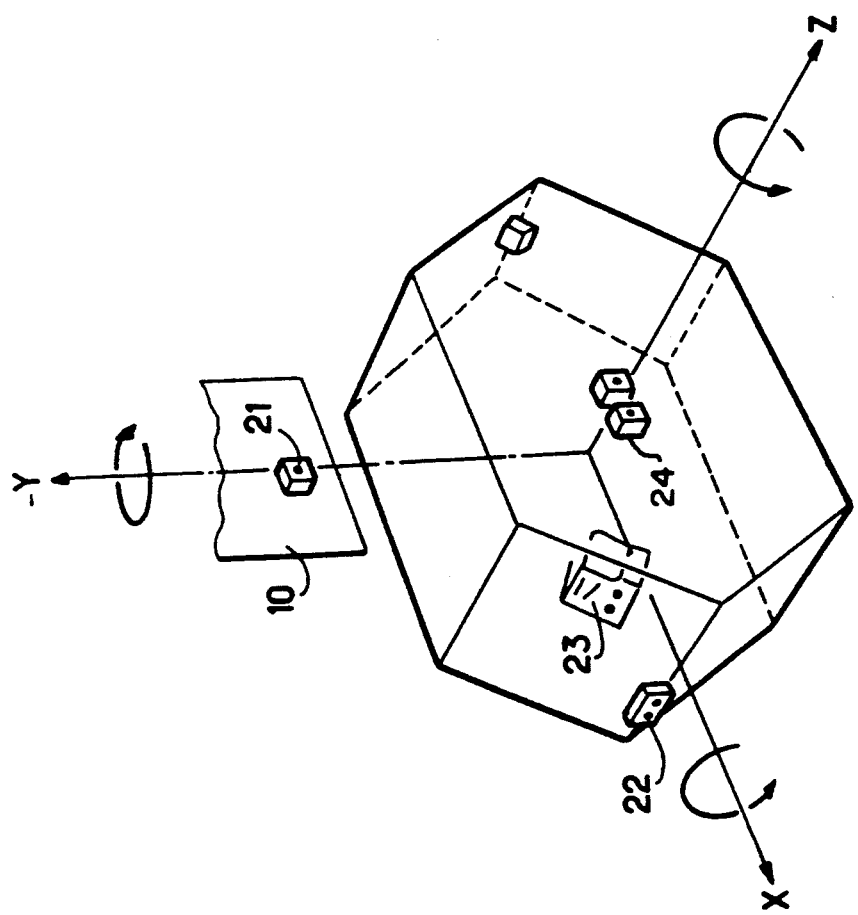

The satellite shown in FIG. 1a comprises suitable measurement apparatus, namely a sun sensor 21 mounted on a solar array 10, a redundant sun sensor 22 with a wide angle field of view and a block of two earth sensors and a V-beam sun sensor 23. The satellite also includes a redundant two-axis infra-red earth sensor 24.

FIG. 1b is a diagrammatic view in the y, z plane of a possible embodiment of the inertia unit of the satellite. This comprises three momentum wheels 31, 32, 33 in skewed wheel configuration.

However, the present invention is not limited to satellites having an inertia unit of this kind and is also applicable to a satellite having a lesser or greater number of flywheels. In case of a zero momentum satellite, the inertia unit includes no momentum wheel but essentially gyrometer integrators, as described below with reference to a particular embodiment of the invention.

Figure 2:
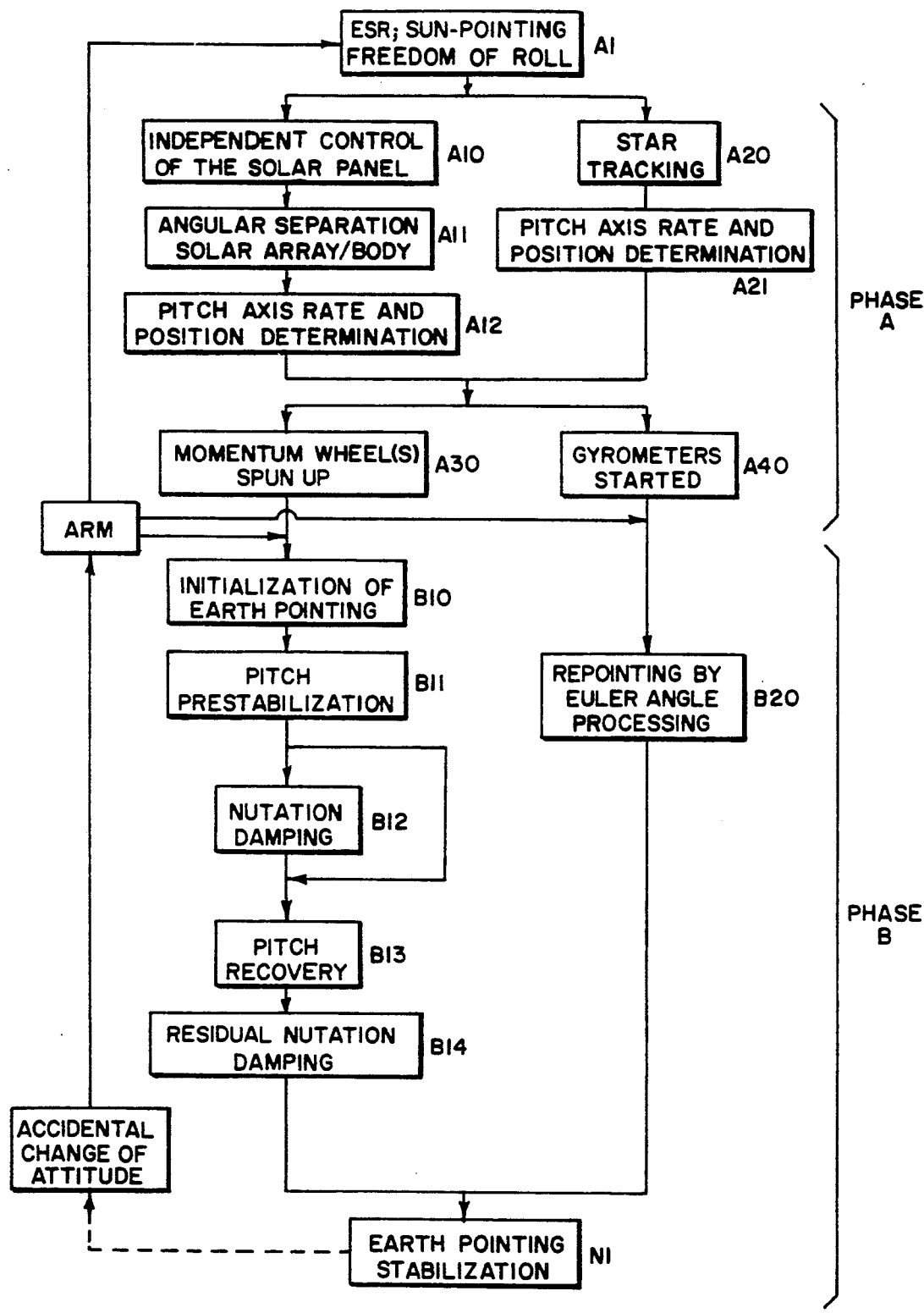
FIG. 2 is a flow chart showing a sequence of phases in an earth re-pointing procedure in accordance with an embodiment of the invention.

The complete procedure in accordance with the preferred embodiment of the invention is shown in FIG. 2. The drawing shows, firstly, a phase A enabling the satellite to be brought from the emergency sun pointing configuration (A 1) to an intermediate position in which the pitch axis is pre-aligned on its stable earth pointing position (A 30, A 40).

As mentioned above, two embodiments of this phase A are possible:
 determining the angular rate and position of the pitch axis of the satellite by sensing the earth appearance cycle using a sensor mounted on the platform of the satellite (A 10, A 11, A 12);
 determining the same parameters of the pitch axis relative to the stars by means of a star tracking system (A 20, A 21).

Phase A is then completed by stabilization of the roll rate of the satellite and re-initialization of the momentum wheel(s) (A 30) (satellite with momentum bias system) or of the integraters gyrometers (A 40) (satellite with zero momentum system).

Phase B corresponds to the final earth re-pointing up to the stabilized position N 1. This phase may either follow on one of the phase A embodiments when the satellite was initially in emergency sun reacquistion (ESR mode) or be initialized directly from the automatic reconfiguration mode (ARM).

In this embodiment of the invention, two possibilities exist also for this phase B:
 earth re-pointing in dual spin configuration of the satellite, before bringing the parameters of the satellite motion within the operational limites of the normal servo loops for earth pointing stabilization (B 10, B 11, B 12, B 13, B 14). This possibility is usable for satellites with momentum bias systems.

earth re-pointing by processing the Euler angles (B 20) in the case of a satellite with zero momentum systems.

Each of the above subsequences in the procedure will be described in more detail below.

However, first, a brief summary will be given of the principle of stabilization of the two inertia systems to which the invention may be applied, i.e. momentum bias stabilization systems and zero momentum stabilization systems.

In a momentum bias control system as in the MARECS satellite, for example, earth pointing is performed in normal conditions by the inertial reference given by a momentum wheel (or a set of several wheels) spinning at nominal speeds of about 4000 r.p.m.

The system shown in FIG. 1 corresponds to the MARECS satellite system and comprises all the elements necessary for momentum bias stabilization. The earth sensor is provided by a two-axis infra-red detector 24. Roll and yaw control are provided by reference to the wheel momentum normal to the orbit plane, by microthruster impulses or by using solar pressure torques exerted on the solar arrays. Pitch control is obtained by adjusting the speed of the momentum wheel, so as to generate a torque on the satellite body. By way of example, the momentum bias attitude control is used in the telecommunication satellites ECS, MARECS, TELECOM, DFS, RCA-SATCOM, FORD-INTELSAT V, and INSAT. Most of these satellites use a skewed wheel system (two or three flywheels in a V-configuration) for additional flexibility and redundance.

Unlike the momentum bias control system, zero momentum systems generally operate in response to a three-axis integrator package (RIG), for example using optical sensing of the satellite position (earth or sun reference sensors) then a re-pointing procedure controlled by the integrator gyrometers following Euler angles processing, and lastly returning to optical earth sensors for fine stabilization in final pointing.

Having described these differences of principle, the effects of an accidental change of the attitude or the behaviour of a satellite which was initially stabilized by momentum bias control in earth pointing attitude will now be summarized rapidly.

Immediately the change of attitude is detected, an alarm and hold mode, such as the ARM mode, is adopted by the satellite. Consequently, all the servo loops which had been ensuring earth-pointing stabilization of the satellite are interrupted.

At this moment, the momentum wheel(s) either stay at constant speed, in the case of tachometer control systems, or is subjected to a slow drift due to mismatch between the flywheel drive torque and frictional drag. Also, depending on the cause of the change of attitude, there may be nutation.

The satellite acquires speed about its pitch axis because of the principle of conservation of angular momentum and the spacecraft body and wheel together form a dual spin configuration.

Angular rates about the other axes depend on the initial nutation. If the destabilization had been caused by an incorrect command sent to the wheel, the nutation may be considerable.

If no action is taken, the satellite progressively goes towards a flat spin situation, resulting finally in rotation about the lateral axes. The time constant of the flat spin motion is typically of the order of a few hours.

The complete sequence is represented in the successive FIGS. 3, 4 and 5.

The new rapid earth re-pointing proceedure according to this embodiment of the invention (phase B) has as its object to avoid solar pointing (ESR mode).

Figure 6:
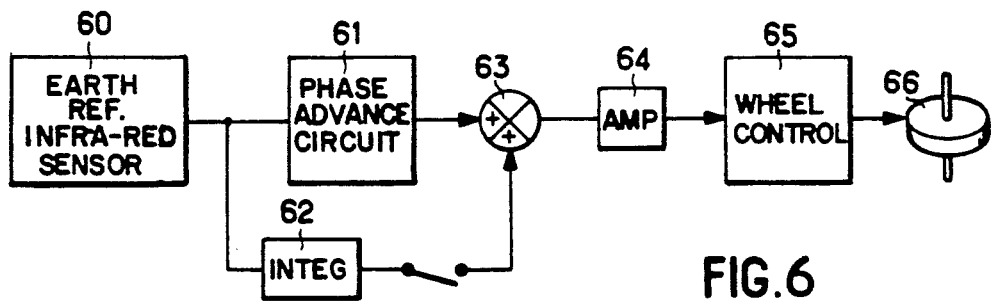
FIG. 6 is a schematic diagram of the satellite pitch servo-control loop corresponding to the normal stabilization mode.

This proceedure is based on the following principles:
preservation of the momentum reference, even in the case of large nutation; the objective is to bring the satellite back to conditions of movement which can be controlled by the normal pitch servo loop. A servo loop such as that shown in FIG. 6 is operational typically for angles of nutation less than 15° and an average pitch speed less than 0.05° per second. This servo loop comprises an earth reference infra-red sensor 60, which supplies a pitch error signal to a phase advance circuit 61, with possible integration in a circuit 62. The resulting signals are supplied through an adder circuit 63 and a gain amplifier 64 to the controls 65 for the wheel 66.

In order to return within the operational limits of this pitch servo control loop, the satellite motion parameters may be brought under control by modification to the pitch torques and checking by means of the sun or earth sensors.

The detail of the successive manoeuvres to be performed, either under the direction of an operator or automatically, corresponds to the steps B 10, B 11, B 12, B 13 and B 14 of FIG. 2.

The initialization step B 10 corresponds to disconnection of the roll servo loop immediately the accidental change of attitude and loss of normal servo loop control are detected. In a case where the pitch servo loop can be maintained, step B 13 is applicable directly.

Otherwise, an open loop servo control configuration is applied consisting of:
connecting all earth and sun sensors available;
connecting all rate gyrometers;
establishing open loop control of flywheel speed.

In this embodiment of the invention, this step is substituted for the ESR mode.

In the next step B 11, pitch pre-stabilization, the objective is to stabilize satellite attitude. This is preferably achieved both by increasing slightly the pitch momentum a few percent over the nominal value and by placing the satellite body in counter-rotation relative to the wheel.

In this stable position, the pitch momentum may be adjusted over a broad range without exciting nutation. This variation of pitch momentum enables pitch speed to be varied with confirmation by data supplied by the sensors. Pitch variation can thus be brought under the limit of 0.05°/sec, which enables the return within the operational limits of the normal pitch servo loop.

In this embodiment of the invention, the reduction of pitch is obtained by maximising the time of appearance of the earth in the field of view of the sensor in each cycle, by action on the pitch momentum.

Figure 7:
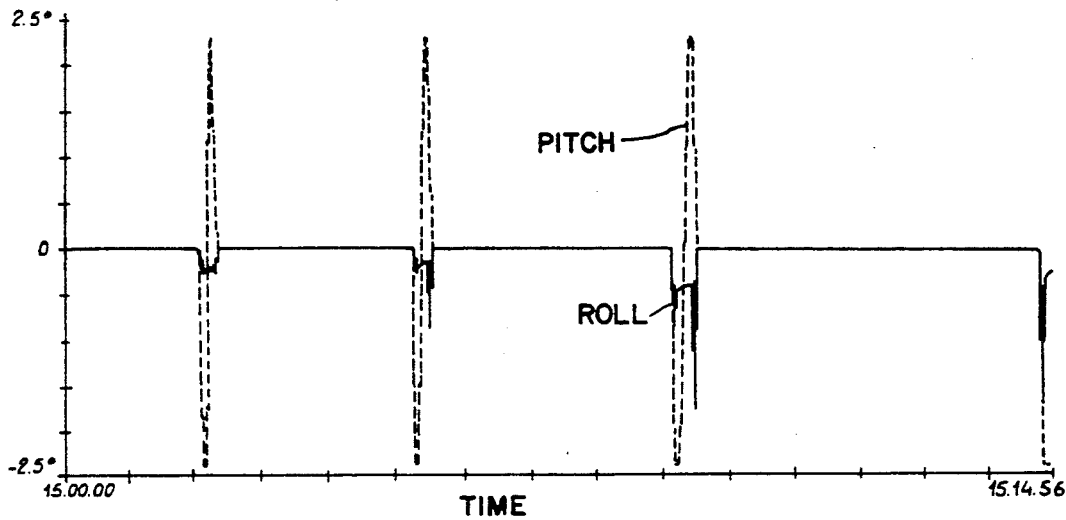
FIGS. 7 and 8 are diagrams showing as a function of time, the signals produced by the infra-red earth sensors (IRES) during the steps of pitch pre-stabilization (FIG. 7) and pitch recovery (FIG. 8) respectively.

FIG. 7 illustrates a typical output signal from the earth sensor during this stage.

When the pitch oscillations are brought under control it may be necessary to perform coarse damping of nutation by passing through step B 12. The objective here is to get the earth suitably within the field of view of the IRES earth sensor.

There exist two fundamental principles enabling control of nutation, namely active control by adjusting transverse momentum, (using wheels or thrusters), and passive control by exchange of momentum between the pitch wheel and satellite body.

The principle here consists in determining the amount of nutation using the gyrometers or the earth or sun sensors. During this operation, the solar panels are locked at 180° relative to each other so as to maximise production of energy.

Figure 9:
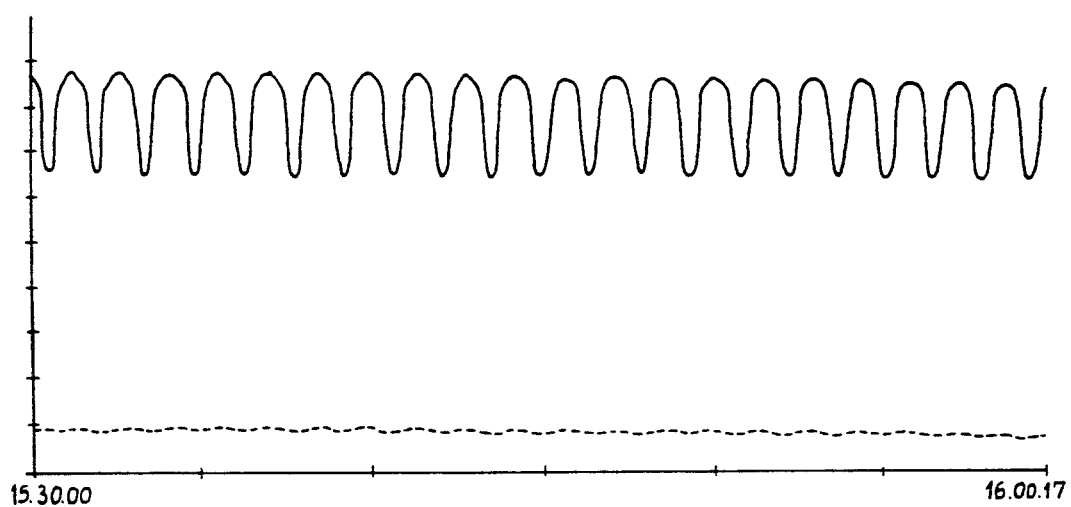
FIG. 9 is a diagram showing, as a function of time, the signals produced by the sun sensors when the satellite is moving in nutation.

Active or passive control of the nutation momentum is continued until sufficient damping is obtained (FIG. 9).

It will be appreciated that this step is unnecessary in the case where the nutation produced by the accidental change of attitude is sufficiently low right from the start.

Figure 8:
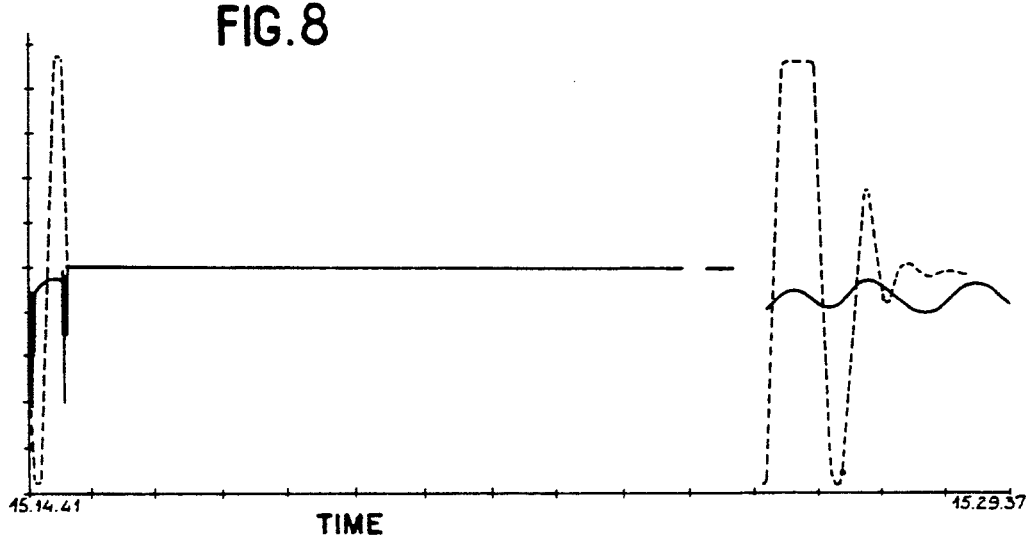

Step B 13, recovery of the pitch axis, is then performed once the pitch rate has been reduced sufficiently and also the nutation motion is less than the operational limit of the pitch servo control loop. This loop is then activated. The dual spin configuration is then under control on a single axis, with small variations in attitude. FIG. 8 shows the convergent output signal obtained from the earth sensor detector during this realignment step.

During this step, it is desirable for the solar arrays to be servo-controlled so as to keep them suitably directed.

Step B 14 then consists in performing the damping of the residual nutation so as to obtain complete stabilization of the satellite in earth pointing. To the extent that the pitch axis is under control, it is sufficient to bring the roll axis under control by detecting variations using the optical sensors or gyrometers. Correction is performed by controlling the transverse moments with the appropriate phase according to the sensor being used. It is also possible to use the thruster pulses.

Once the roll rate has come back inside the operational limit of the roll servo control loop, the servo control is reactivated and the satellite is finally stabilized in earth pointing N1.

When the satellite is initially in the safeguard solar pointing mode ESR, the earth pointing phase B described above must be preceded by one of the two phase A modes as shown in FIG. 2.

The overall repointing procedure is then applicable to both momentum bias systems and to zero momentum systems.

In the first case, the objective is to bring the angular momentum which has been destroyed in ESR mode into a direction perpendicular to the orbit plane in order to be able to pass to phase B.

In application to zero momentum systems, the procedure consists in determining the satellite attitude for re-initialization of the integrator gyrometers. It is then possible to define a strategy enabling earth pointing to be restored by manoeuvres on a single axis and Euler angles processing.

Whatever the stabilization mode of the satellite, two methods are presented, one usable in conjunction with apparatus existing on most of the satellites already launched and the other requiring a specific star tracking apparatus. However, the objective of both phase A methods is to determine the angular rate and position of the satellite pitch axis so as to be able to chose the moment in the cycle of moment of the satellite when the phase B earth repointing is to be actuated.

As mentioned above, the safeguard solar pointing mode ESR has the feature of freedom of roll around the sun line of the satellite with active control of the two sun pointing axes. The main inertia unit is usually stopped.

In a first method of preparing earth re-pointing, the objective is to utilise the rotation of the satellite about its roll axis pointed sunwards to make the earth enter cyclically into the field of view of the earth reference sensor. The angle of view of the earth sensor is limited. The objective is therefore to make the earth sensor perform a conical scan intercepting the earth at a point in the scan cycle.

This is achievable because, for all times of the day, and therefore for the precise time at which it is desired to initialize re-pointing, the angle presented between the direction of the sun and the direction of the earth as seen from the satellite is well known. Consequently, if this angle is taken as the value for the half-angle of the scan cone of the earth sensor (relative to the known sun direction), it is certain that the scan cone includes the earth direction at one point in the scan cone.

The cyclic intersections with the earth then enable both the rotational angular velocity and the angular position of the satellite at any moment to be determined. This data is used to re-establish an angular momentum normal to the orbit plane, as will be seen below.

There are two ways of achieving the conic scan of the earth sensor constituting the first method of preparing for earth pointing, as described herein:

by using SAS sun sensor (the use of a sun sensor SAS of the platform is mentioned by way of illustration and explanation, although its inherent limitations restrict its usage);

by using a solar array sun sensor SASS of the solar panels after angular separation solar panels/spacecraft body (step A 11).

Figure 10A:
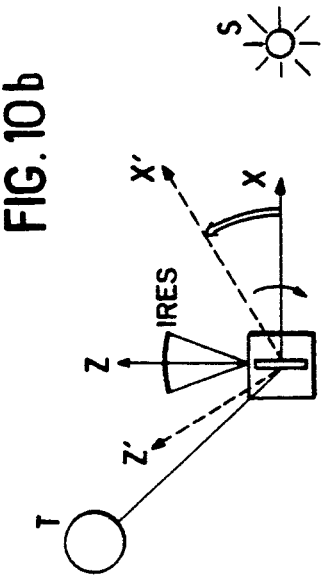
FIGS. 10a, 10b are diagrammatic perspective and plan views, respectively, of the satellite showing a first way of determining its angular rate and position (step A 12) by conical scanning of a SAS sensor.

In ESR pointing, the satellite is pointed towards the sun with two-axis control by the sun sensor SAS, pitch sensing and yaw data. FIG. 10*a* shows this configuration diagrammatically, in which the directions of the y and z axes are unknown, while the x axis points towards the sun with rotation of the satellite at low speed about this x-axis.

Figure 10B:
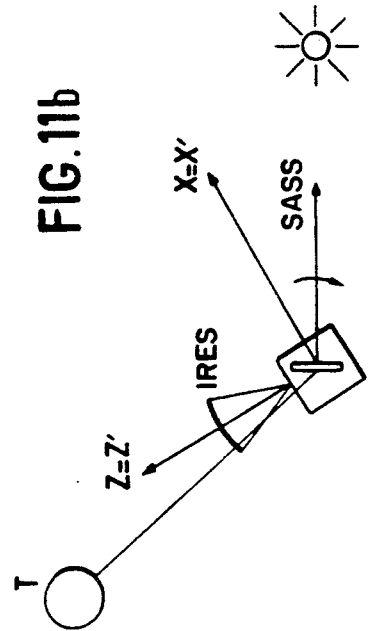

Starting from this pointing of the x-axis sunwards, a bias is applied into the SAS pitch loop. This causes a displacement of the x-axis to x' (FIG. 10*b*) with concomitant displacement of the z-axis (corresponding to the center of the field of view of the earth sensor) to z'. Because of the steady roll rate, the x-axis performs a conic scan about the sun (as also does the z-axis), such that it intercepts regularly the direction of the earth.

The non-linear characteristics of the solar sensor SAS limit the offset angle to about 20° but by adding the 20° of the sensor field of view a significant proportion of the "hours of the day" can be covered.

Figure 11A:
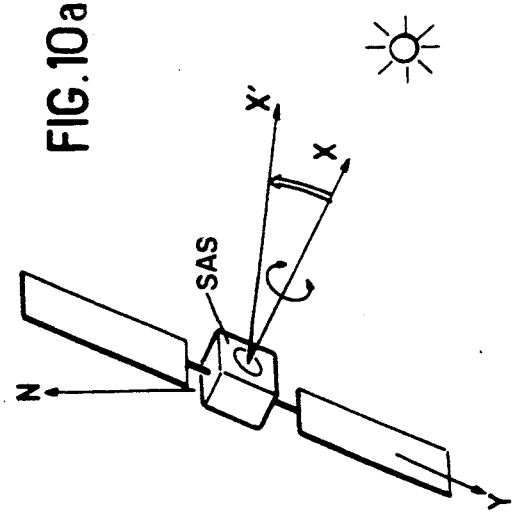
FIGS. 11a, 11b are similar diagrams showing a second way of determining the satellite's angular rate and position (step A 12) by angular separation solar array/platform (step A 11)
Figure 11B:
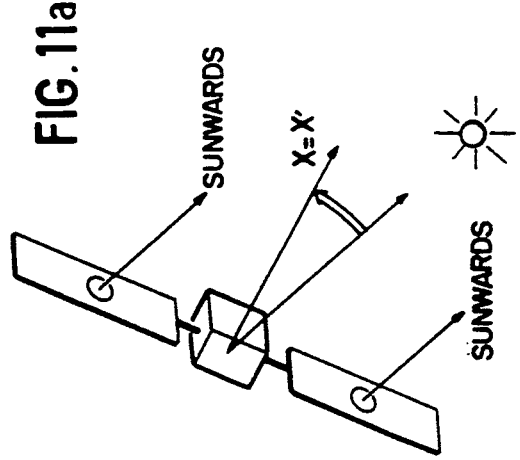
Figure 12A:
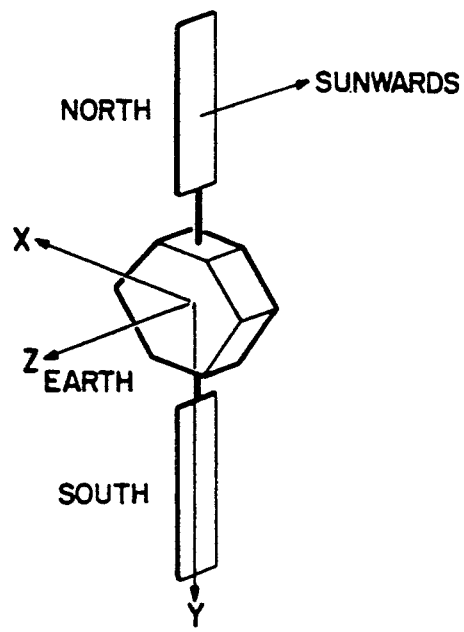
FIGS. 12a, 12b, 12c are similar diagrams showing three steps in the slow prior art earth re-pointing procedure starting from the safeguard solar pointing in the ESR mode.
Figure 12B:
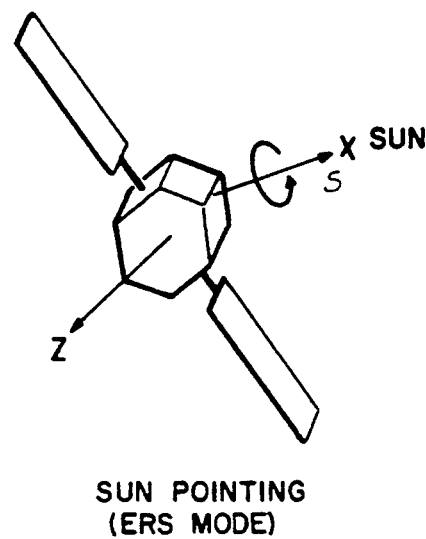
Figure 12C:
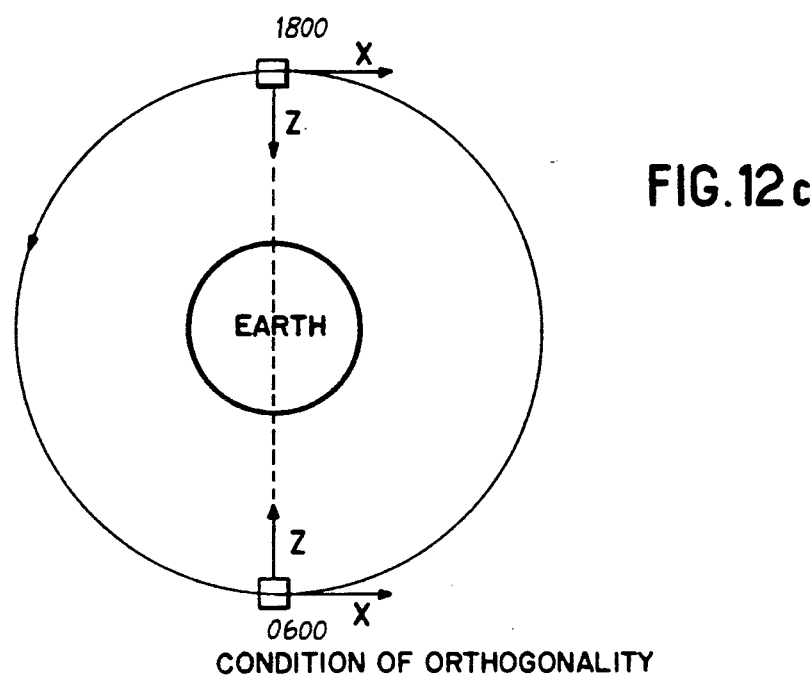

The step A 11 of FIG. 2 corresponds to a second, more flexible, way of determining the angular rate and position of the satellite, using an angular separation solar arrays/spacecraft body (FIG. 11*a*, 11*b*).

In this case, the pitch control of the satellite is first transferred to the solar sensor SASS mounted on the solar panels, instead of having this control being performed by a solar sensor SAS on the platform when the satellite is in the safeguard mode ESR. The yaw servo loop is also disconnected (step A 10).

Next, the solar array drive is activated until the field of view of the infra-red earth sensor (IRES) and the direction of the sun present between them an angle corresponding to the two directions at the precise time of the procedure (step A 11). The x-axis goes to x', which gives the conic scan of the earth sensor (FIG. 11b). This way of capturing the earth in the field of view of the IRES is applicable whatever the required angle of deviation.

However, in the second method illustrated in FIG. 11b, it will be noted that the angular velocity of rotation about the direction of the sun no longer corresponds to the roll rate of satellite, but the gyrometers aligned on z can be started.

After determining the angular rate and position of the satellite, the wheel must be started, so as to establish an angular momentum normal to the orbit plane. This means that the yaw axis must be perpendicular to the orbit plane, pointing southwards, with rates about all axes to zero, or at least very small.

This preparation of the re-pointing requires the satellite to be placed in a particular attitude, since spinning up the wheel is an operation which is not instantaneous, and, on the contrary, may take up to ten minutes or more at maximum torque.

Now, the displacements of the satellite cannot simply be stopped at the moment when the y-axis is pointing southwards, for two reasons:
the angular motion is performed about the direction of the sun. Now, this rotation cannot be considered as a pure roll rate in the body of the satellite and consequently the thrusters cannot apply a suitable torque to reduce the rate to zero.

For this reason it will usually be necessary (after step A 12) to off-set the satellite z-axis supplementarily so as to align it with the direction of the sun (but in the opposite direction). In this configuration, the earth leaves the field of view of the earth sensor IRES. However, the yaw thrusters can then be actuated to stop the angular rate with a correct phase.

It is also possible to bring the x-axis to solar pointing to achieve the same result. However, the alignment of the yaw axis z in anti-solar pointing will often be preferable because the yaw gyrometer provides an easier rate estimation than the sun sensor SAS.

In the cases where it is necessary, this step of correction of the yaw torque is performed, for example, by commanding yaw thruster impulses. Firing must take place at the moment of earth crossing, after alignment of the yaw axis in anti-solar pointing as indicated above. The yaw gyrometer then provides confirmation of the correction performed, preferably enabling yaw variations less than 0.01°/sec to be obtained.

The stabilization method thus performed does not take account of the inclination of the satellite orbit plane relative to the sun direction. Now, the elevation of the sun relative to the orbit plane goes up to 23°.

If this angle is ignored, the initialized angular momentum is off-set up to 23° relative to the normal to the orbit. This offset may then be cancelled by means of the normal pointing servo loops after earth acquisition has occured.

However it is also possible to set up a bias in the SAS yaw loop so as to compensate the sun elevation. The value of this off-set is a function of the season (solar declination) and the time of the re-pointing.

The following step A 30 (for momentum bias satellites) or A 40 (for zero momentum satellites), consists in stopping the roll rotation and re-initializing the wheels and/or the gyrometers, respectively, so as to pass to phase B of earth re-pointing.

The fast earth recovery procedure for satellites under momentum bias control has already been described above.

In the case of a zero momentum stabilized satellite it is the signals from the integration gyrometers which enable re-pointing and stabilization of the satellite in its nominal position by processing the Euler angles (B 20).

The second methods of return from the ESR mode makes use of an star tracker of the slit or matrix type of low absolute accuracy. This apparatus is intended to determine the position and speed of rotation of the pitch axis using techniques of recognition of star patterns for stars of a given illumination magnitude.

This step of star pattern recognition may be performed entirely under the control of the earth station, either by use of a specific software package, or by manual interpretation by the ground operator.

When the attitude and movement of the satellite have been determined, the roll motion is stopped and, in the same way as for the preceding method the wheel(s) (A 30) or the gyrometers (A 40) are started, according to the nature of the satellite stabilization system.

The star tracker used in step A 20 is advantageously a slit or matrix CCD apparatus of low absolute accuracy (for example of the order of 1°) but medium resolution (up to 0.1°). This unit advantageously has a selectable detection level for the magnitude of star illumination which may be chosen by the earth control station. The star pattern picked up may be transmitted to earth through the normal telemetry channels for interpretation. The unit may, for example, work between 0° and 1°/sec, with a field of view making an angle of 20° to 40°, perpendicular to the sun direction.

The above procedure offers several methods of earth re-pointing which are adapted to different kinds of on-board equipment on the satellites. Each embodiment will enable re-pointing to be obtained usually in less than one hour.

It will be appreciated that each of the methods limits to the minimum the use of the thrusters and optimises the use of the solar panels for generation of energy.

In its application to telecommunication satellites which are stabilized in three axes in geostationary orbit, the procedure in accordance with these embodiments of the invnetion enables the durations for which the satellite is non-operational to be substantially reduced.

We claim:

1. An earth recovery procedure for a nominally earth-pointing, three axis stabilized satellite capable of dual spin operation, said satellite having a body; a solar array with solar panels; direction reference means; pitch servo control means, and roll servo control means; and attitude correction means for altering satellite attitude; said procedure comprising the following steps:
   (i) an initialization step comprising deactivating the servo loop of said roll servo control means, activating said direction reference means, and assuming open-loop control of attitude using said attitude correction means;
   (ii) a pitch pre-stabilization step comprising placing the satellite in the dual spin configuration, with counter-rotating body; responding to signals from said direction reference means to determine pitch movement; and controlling the pitch movement using said attitude correction means to bring the pitch rate within the operating limits of said pitch servo control means by earth capture in pitch with single axis control;

(iii) a pitch recovery step comprising activating the pitch servo control means for controlling the pitch movement of the satellite; and (iv) a residual nutation damping step comprising exerting transverse roll/yaw torque by action of said attitude correction means until earth capture by said roll servo control means.

2. A procedure as claimed in claim 1 wherein said attitude correction means comprises momentum wheels and said procedure includes an additional nutation damping step previous to said pitch recovery step if the nutation of the satellite is of an amplitude greater than the operating limits of said pitch servo control means, said additional nutation damping step comprising locking said solar panels at an angle of substantially 180° relative to each other so as to improve power balance, and damping the nutation by momentum exchange between said momentum wheels and satellite body.

3. A procedure as claimed in claim 1, including an additional nutation damping step previous to said pitch recovery step if the nutation of the satellite is of an amplitude greater than the operating limits of said pitch servo control means, said additional nutation damping step comprising locking said solar panels at an angle of substantially 180° relative to each other, so as to improve power balance, and damping the nutation by generating transverse momentum using said attitude correction means.

4. A procedure as claimed in claim 1, wherein said pitch pre-stabilization step comprises bringing the satellite to a nutation angle less than 15° and a pitch angular velocity less than 0.05° per second.

5. A procedure as claimed in claim 1, wherein said direction reference means includes a sun sensor mounted on said solar panels and an earth sensor, wherein said attitude correction means includes a momentum wheel, wherein said satellite is initially stabilized in the solar direction in two axes, with freedom of roll, and including the following sequence of steps preceding said initialization step:

a solar array servo control step in which the solar arrays are pointed and locked sunwards using said sun sensor mounted on said solar panels;

a solar panel skewing step in which the satellite body is skewed relative to said solar panels by an angle related to that between the sun and earth directions seen from the satellite at the local time of the recovery;

a satellite attitude determination step in which the satellite attitude is determined by reference to the cyclic variation of signals from said earth sensor corresponding with appearances of the earth in the field of view of said earth sensor during roll movement; and a roll rate arresting step with wheel spin up at a time when the pitch axis is in a position favourable to earth recovery by carrying out the subsequent steps of the procedure.

6. A procedure as claimed in claim 5, wherein said roll rate arresting step is preceded by a step of acting to reduce yaw rotation of the satellite.

7. A procedure as claimed in claim 1, wherein said direction reference means further includes star tracking means, wherein said attitude correction means includes a momentum wheel, wherein said satellite is initially stabilized in the solar direction in two axes, with freedom of roll, and including the following sequence of steps preceding said initialization step:

a star detection step in which stars are detected using said star tracking means;

a satellite attitude determination step in which the satellite attitude is determined by reference to the start pattern detected; and a roll rate step arresting with wheel spin up at a time when the pitch axis is in a position favourable to earth recovery by carrying out the subsequent steps of the procedure.

8. A procedure as claimed in claim 7, wherein said star tracking means is a CCD device of the matrix or slit type.

9. A procedure as claimed in claim 1, wherein said direction reference means includes a sun sensor and an earth sensor, wherein said attitude correction means includes a momentum wheel, wherein said satellite is initially stabilized in the solar direction in two axes, with freedom of roll, and including the following sequence of steps preceding said initialization step:

a solar pointing step in which the satellite is pointed sunward using said sun sensor;

a satellite body skewing step in which the satellite body is skewed so that the earth appears in the field of view of the earth sensor;

a satellite attitude determination step in which the satellite attitude is determined by reference to the cyclic variation of signals from said earth sensor corresponding with appearances of the earth in the field of view of said earth sensor during roll movement; and a roll rate arresting step with wheel spin up at a time when the pitch axis is in a position favourable to earth recovery by carrying out the subsequent steps of the procedure.

10. A procedure as claimed in claim 9 wherein said roll rate arresting step is preceded by a step of acting to reduce yaw rotation of the satellite.

11. An earth recovery procedure for a nominally earthpointing satellite of the zero momentum type, said satellite having a body; a solar array with solar panels; direction reference means including at least a sun sensor and an earth sensor, said sun sensor being mounted on the solar panels; integrator gyrometer control means; and attitude correction means for altering satellite attitude; said procedure comprising:

a solar array servo control step in which the solar arrays are pointed and locked sunwards using said sun sensor mounted on said solar panels;

a solar panel skewing step in which the satellite body is skewed relative to said solar panels by an angle related to that between the sun and earth directions seen from the satellite at the local time of the recovery;

a satellite attitude determination step in which the satellite attitude is determined by reference to the cyclic variation of signals from said earth sensor corresponding with appearances of the earth in the field of view of said earth sensor during roll movement;

a roll rate arresting step with gyrometer initialization at a time when the pitch axis is in a position favourable to earth recovery; and an earth re-pointing step comprising restoring the satellite to the earth pointing condition by Euler angles processing under control of the integrator gyrometer control means.

12. A procedure as claimed in claim 11 wherein the roll rate arresting step is preceded by a step of acting to reduce yaw rotation of the satellite.

13. An earth recovery procedure for a nominally earthpointing satellite of the zero momentum type, said satellite having a body; a solar array with solar panels; direction reference means including at least a sun sensor and an earth sensor, said sun sensor being mounted on the solar panels; integrator gyrometer control means; and an attitude correction means for altering satellite attitude; said procedure comprising:
- a solar pointing step in which the satellite is pointed sunward using said sun sensor;
- a satellite body skewing step in which the satellite body is skewed so that the earth appears in the field of view of the earth sensor;
- a satellite attitude determination step in which the satellite attitude is determined by reference to the cyclic variation of signals from said earth sensor corresponding with appearances of the earth in the field of view of said earth sensor during roll movement;
- a roll rate arresting step with gyrometer initialization at a time when the pitch axis is in a position favourable to earth recovery; and
- an earth re-pointing step comprising restoring the satellite to the earth pointing condition by Euler angles processing under control of the integrator gyrometer control means.

14. A procedure as claimed in claim 13 wherein the roll rate arresting step is preceded by a step of acting to reduce yaw rotation of the satellite.

15. An earth recovery procedure for a nominally earthpointing satellite of the zero momentum type, said satellite having a body; a solar array with solar panels; direction reference means including a sun sensor, an earth sensor, and star tracking means; integrator gyrometer control means; and attitude correction means for altering satellite attitude; said procedure comprising:
- a star detection step in which stars are detected using said star tracking means;
- a satellite attitude determination step in which the satellite attitude is determined by reference to the star pattern detected;
- a roll rate step arresting with gyrometer initialization at a time when the pitch axis is in a position favourable to earth recovery; and
- an earth re-pointing step comprising restoring the satellite to the earth pointing condition by Euler angles processing under control of the integrator gyrometer control means.

16. A procedure as claimed in claim 15, wherein the roll rate arresting step is preceded by a step of acting to reduce yaw rotation of the satellite.

17. A procedure as claimed in claim 15, wherein said star tracking means is a CCD device of the matrix or slit type.

* * * * *